United States Patent [19]

Sutherland et al.

[11] Patent Number: 5,272,211
[45] Date of Patent: Dec. 21, 1993

[54] BLOCK COPOLYMERS OF DIENES, VINYLARENES, AND ALKYLMETHACRYLATES AS MODIFIED VISCOSITY INDEX IMPROVERS

[75] Inventors: Robert J. Sutherland; Donn A. DuBois, both of Houston, Tex.

[73] Assignee: Shell Oil Company, Houston, Tex.

[21] Appl. No.: 993,739

[22] Filed: Dec. 21, 1992

[51] Int. Cl.$^5$ .............. C08F 297/02; C08F 8/32; C10M 145/14; C10M 149/00

[52] U.S. Cl. ................. 525/299; 525/192; 525/250; 525/271; 525/302; 525/308; 525/309; 525/310; 525/330.3; 525/378; 525/379; 525/940; 252/56 R; 252/50

[58] Field of Search .......... 525/299, 271, 250, 298, 525/302, 378, 379, 330.3; 252/56 R, 50

[56] References Cited

U.S. PATENT DOCUMENTS

| | | | |
|---|---|---|---|
| 3,359,345 | 12/1957 | Doak et al. | 525/301 |
| 3,639,521 | 2/1972 | Hsieh | 525/98 |
| 3,890,408 | 6/1975 | Schepers et al. | 525/271 |
| 4,029,720 | 6/1977 | Seiler et al. | 525/89 |
| 4,080,406 | 3/1978 | Kelsey | 525/310 |
| 4,246,374 | 1/1981 | Kopchik | 525/242 |
| 4,461,874 | 7/1984 | Teyssié et al. | 525/299 |
| 4,530,973 | 7/1985 | Koster et al. | 525/310 |
| 4,695,607 | 9/1987 | Spinelli | 525/272 |
| 4,786,689 | 11/1988 | Lund et al. | 525/250 |
| 4,788,361 | 11/1988 | Olson et al. | 585/10 |
| 4,794,145 | 12/1988 | Lund et al. | 525/250 |
| 5,002,676 | 3/1991 | Willis et al. | 525/330.3 |
| 5,166,274 | 11/1992 | McGrath et al. | 525/271 |
| 5,194,510 | 3/1993 | DuBois | 525/299 |
| 5,218,053 | 6/1993 | DuBois | 525/285 |

FOREIGN PATENT DOCUMENTS

| | | |
|---|---|---|
| 307818 | 9/1987 | European Pat. Off. . |
| 0298667 | 1/1989 | European Pat. Off. ......... 525/299 |
| 0356249 | 2/1990 | European Pat. Off. . |
| 1212987 | 11/1970 | United Kingdom . |

Primary Examiner—James J. Seidleck
Assistant Examiner—M. L. Warzel
Attorney, Agent, or Firm—Keith M. Tackett

[57] ABSTRACT

Polymers comprising blocks of a hydrogenated conjugated diene (B), a vinylarene (A), and an alkyl methacrylate (M), are readily prepared as a mixture of molecules having the structures B-A-M and B-A-M-A-B wherein both structures are effective as viscosity index improvers for oil compositions. Reaction of the polymers with a primary or secondary amine results in a dispersant viscosity index improver.

10 Claims, No Drawings

BLOCK COPOLYMERS OF DIENES, VINYLARENES, AND ALKYLMETHACRYLATES AS MODIFIED VISCOSITY INDEX IMPROVERS

FIELD OF THE INVENTION

This invention relates to linear polymers having ester groups. More particularly, the invention relates to modified polymers of vinylarenes and hydrogenated conjugated dienes useful as viscosity index improvers for oil compositions.

BACKGROUND OF THE INVENTION

Linear block copolymers of styrene and hydrogenated isoprene having the block structures styrene-hydrogenated isoprene (S-EP) or hydrogenated isoprene-styrene-hydrogenated isoprene (EP-S-EP) are useful as viscosity index improvers for lubricating oils as described in U.S. Pat. No. 4,788,361.

The addition of amide groups to viscosity index improvers generally increases the dispersancy of accumulated sludges in lubricating oils. The addition of amide groups to a styrene-hydrogenated isoprene block copolymers can be accomplished by addition a block of a methacrylate as described in U.S. Pat. No. 3,890,408 followed by conversion of the methacrylate to an amide as described in U.S. Pat. No. 4,246,374. However, the addition of methacrylate blocks generally results in coupling of the polymer which substantially impairs the properties of the viscosity index improver.

The '408 patent describes a solution to the coupling problem wherein a small amount of 1,1-diphenyl ethylene is polymerized just prior to polymerization of the methacrylate to minimize coupling. However, the cost of this solution is high and does not totally eliminate the problem of coupled polymers of styrene-hydrogenated isoprene-methacrylate-hydrogenated isoprene-styrene (S-EP-M-EP-S) which excessively thicken oil compositions.

SUMMARY OF THE INVENTION

Linear polymers having the block structure hydrogenated conjugated diene-vinylarene-methacrylate (B-A-M), e.g. hydrogenated isoprene-styrene-t-butylmethacrylate, are useful dispersant viscosity index improvers after the alkyl methacrylate block is converted to amide or imide groups. Coupling of some of the methacrylate blocks during manufacturing results in a coupled polymer component having the block structure hydrogenated conjugated diene-vinylarene-methacrylate-vinylarene-hydrogenated conjugated diene (B-A-M-A-B). The molecular weights of the blocks are selected to produce uncoupled and coupled linear polymers which are useful dispersant viscosity index improvers after conversion of the alkyl methacrylate block to amide or imide groups. The dispersant viscosity index improvers of the invention exhibit improved low temperature properties and improved shear stability.

DESCRIPTION OF THE INVENTION

The novel polymers of the invention are produced by reaction of a primary or secondary amine and a base block copolymer of a hydrogenated conjugated diene, a vinylarene, and a methacrylate. The base block copolymer has the block structure hydrogenated conjugated diene-vinylarene-methacrylate (B-A-M).

The vinylarene employed in the base block copolymer is a hydrocarbon compound of up to 18 carbon atoms having an alkenyl group of up to 6 carbon atoms attached to a ring carbon atom of an aromatic ring system of up to 2 aromatic rings. Such vinylarenes are illustrated by styrene, 2-butenylnaphthalene, 4-t-butoxystyrene, 3-isopropenylbiphenyl, and isopropenylnapthalene. The preferred vinylarenes have an alkenyl group of up to 3 carbon atoms attached to a benzene ring as exemplified by styrene and styrene homologs such as styrene, α-methylstyrene, p-methylstyrene, and α,4-dimethylstyrene. Styrene and α-methylstyrene are particularly preferred vinylarenes, especially styrene.

The vinylarene block is preferably at least 80% by weight polymerized vinylarene and is most preferably homopolymeric.

The hydrogenated conjugated diene employed in the base block copolymer preferably comprises at least 90% by weight of the polymerized conjugated diene. Most preferably, the conjugated diene block is homopolymeric. The conjugated dienes preferably have up to 8 carbon atoms. Illustrative of such conjugated dienes are 1,3-butadiene (butadiene), 2-methyl-1,3-butadiene, (isoprene), 1,3-pentadiene (piperylene), 1,3-octadiene, and 2-methyl-1,3-pentadiene. Preferred conjugated alkadienes are butadiene and isoprene, particularly isoprene.

The preferred methacrylates are alkyl methacrylates which are described in U.S. patent application Ser. No. 5,218,053, which is incorporated by reference herein. The alkyl methacrylate block employed in the base block copolymer is preferably a methacrylate block or segment comprising at least two adjacent units of a polymerized (1-methyl-1-alkyl)alkyl methacrylate. Homopolymeric methacrylate blocks of (1-methyl-1-alkyl)alkyl methacrylates are most preferred.

The preferred methacrylates have the structure:

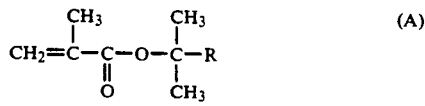

wherein R is an alkyl group comprising from 1 to 10 carbon atoms, most preferably methyl. Adjacent (1-methyl-1-alkyl)alkyl ester groups convert to stable anhydride rings having six members after upon heating of the polymer to a temperature in excess of 180° C. Thermal conversion to anhydride rings likely occurs during reaction of the base polymers with amines and facilitates formation of amide or imide groups.

Examples of the preferred methacrylates of Formula A include:

1,1-dimethylethyl-α-methylacrylate, (t-butylmethacrylate), and 1,1-dimethylpropyl-α-methylacrylate (t-pentylmethacrylate).

The most preferred alkyl ester is t-butylmethacrylate which is commercially available in high purity from Mitsubishi-Rayon, Japan. Less pure t-butylmethacrylate is available from Monomer, Polymer and Dajac and can be used if passed through a column of alumina and 13X zeolite to remove methacrylic acid and t-butylalcohol. The preferred zeolites have a cavity size no less than 10 angstroms such as Zeolite 13X which has the formula $Na_{86}(AlO_2)_{86}(SiO_2)_{106}\cdot 267H_2O$.

The base block copolymers are anionically polymerized in the presence of a metal alkyl initiator, preferably an alkali metal alkyl. The use of such initiators in anionic polymerizations is well known and conventional. A particularly preferred initiator is sec-butyllithium.

The polymerization of the vinylarenes takes place in a non-polar hydrocarbon solvent such as cyclohexane or in mixed polar/non-polar solvents, e.g., mixtures of cyclohexane and an ether such as tetrahydrofuran or diethyl ether. Suitable reaction temperatures are from about 20° C. to about 80° C. and the reaction pressure is sufficient to maintain the mixture in the liquid phase. The resulting product includes a living poly(vinylarene) block having a terminal organometallic site which is used for further polymerization.

The polymerization of the conjugated alkadiene takes place in a solvent selected to control the mode of polymerization. When the reaction solvent is non-polar, the desired degree of 1,4 polymerization takes place whereas the presence of polar material in a mixed solvent results in an increased proportion of 1,2 polymerization. Polymers resulting from about 6% to about 95% of 1,2 polymerization are of particular interest for branched conjugated dienes such as isoprene.

Polymerization of the methacrylates takes place in the mixed solvent containing the polymerized conjugated alkadiene at a temperature from about −80° C. to about 100° C., preferably from about 10° C. to about 50° C.

Subsequent to production of the methacrylate block, the polymerization is terminated by either reaction with a protic material, typically an alkanol such as methanol or ethanol. The polymers are then recovered by well known procedures such as precipitation or solvent removal.

The polymers produced by the above procedures will undergo some coupling through an ester group on an adjacent living molecule prior to termination unless the living polymer chains are first end-capped with a unit of 1,1-diphenylethylene or α-methylstyrene. Ester coupling occurs in about 10–50% of the polymer by weight if left unchecked. For the present invention, such coupling is acceptable since the coupled product is also useful as a viscosity index improver. Coupling of some of the methacrylate blocks during manufacturing results in a coupled polymer component having the block structure hydrogenated conjugated diene-vinylarene-methacrylate-vinylarene-hydrogenated conjugated diene (B-A-M-A-B). The molecular weights of the blocks are selected to produce uncoupled and coupled linear polymers which are useful dispersant viscosity index improvers after conversion of the alkyl methacrylate block to amide or imide groups.

The conjugated diene blocks have a peak molecular weight from 10,000 to 500,000 prior to any coupling, preferably from 30,000 to 200,000. The vinylarene blocks have a peak molecular weight from 1,000 to 50,000 prior to any coupling, preferably from 5,000 to 40,000. The non-coupled methacrylate blocks have a peak molecular weight from 200 to 10,000, preferably from 200 to 5,000, prior to conversion to amide or imide groups.

The base polymers are selectively hydrogenated to reduce the extent of unsaturation in the aliphatic portion of the polymer without substantially reducing the unsaturation of any aromatic portion of the block copolymer. A number of catalysts, particularly transition metal catalysts, are capable of selectively hydrogenating the aliphatic unsaturation of a copolymer of an alkenyl aromatic compound and a conjugated diene, but the presence of the methacrylate block can make the selective hydrogenation more difficult. To selectively hydrogenate the aliphatic unsaturation it is preferred to employ a "homogeneous" catalyst formed from a soluble nickel compound and a trialkylaluminum. Nickel naphthenate or nickel octoate is a preferred nickel salt. Although this catalyst system is one of the catalysts conventionally employed for selective hydrogenation absent alkyl methacrylate blocks, other "conventional" catalysts are not suitable for selective hydrogenation of the conjugated dienes in the presence of methacrylate blocks.

In the selective hydrogenation process, the base polymer is reacted in situ, or if isolated is dissolved in a suitable solvent such as cyclohexane or a cyclohexane-ether mixture and the resulting solution is contacted with hydrogen gas in the presence of the homogeneous nickel catalyst. Hydrogenation takes place at temperatures from about 25° C. to about 150° C. and hydrogen pressure from about 15 psig to about 1000 psig. Hydrogenation is considered to be complete when at least about 90%, preferably at least 98%, of the carbon-carbon unsaturation of the aliphatic portion of the base polymer has been saturated, as can be determined by nuclear magnetic resonance spectroscopy. Under the conditions of the selective hydrogenation no more than about 5% and preferably even fewer of the units of the vinylarene blocks will have undergone reaction with the hydrogen. The selectively hydrogenated block polymer is recovered by conventional procedures such as washing with aqueous acid to remove catalyst residues and removal of the solvent and other volatiles by evaporation or distillation.

The amide or imide groups in the polymers of the invention are produced by heating the base polymers to a temperature in excess of 180° C. in the presence of a primary or secondary amine. Heating is preferably conducted in an extruder having a devolatization section to remove any volatile by-products.

Primary amines useful for adding dispersancy properties include compounds having the structure R—NH$_2$ wherein R is an alkyl group as described in column 3, lines 32–62, of U.S. Pat. No. 4,246,374 which disclosure is incorporated by reference herein. The most preferred primary amine is 3-diethylaminopropylamine. Secondary amines having the structure R$_1$R$_2$—NH will also contribute dispersancy properties but are not preferred.

The invention is further illustrated by the following Illustrative Embodiments which should not be construed as limiting. The examples are illustrative of a bench-scale synthesis, however the reaction conditions (i.e. solvents, temperatures and reaction times) are very similar to procedures used for pilot plant runs.

EXAMPLE 1

A two liter Büchi reactor was charged with 1500 ml of cyclohexane at 25° C. and 80 grams of isoprene monomer. Then impurities were titrated with sec-butyllithium. The temperature was increased to 60° C. and 0.6 grams of 12.11% sec BuLi was added to the mixture, and reacted for 30 minutes. Still at 60° C., 34.3 grams of styrene monomer was added and reacted for 20 minutes. The temperature was decreased to 35° C. and the styrene was reacted for another 20 minutes. Next 2.3 grams of tert-butylmethacrylate was added at 50° C. and allowed to react for 20 minutes. The reaction was killed with 0.09 ml of methanol prior to hydrogenation.

The polymer solution was then hydrogenated with a nickel catalyst composed of nickel octoate reduced by triethyl aluminum (Al/Ni=2.3:1). The resulting product showed a 96.9% conversion of double bonds to single bonds in the isoprene block. GPC shows 42% coupled material (EP-S-tBMA-S-EP) in the product.

Following hydrogenation, the polymer was melt modified in a Brabender mixing head at 250° C. for 3 minutes in the presence of a slight excess of a 50/50 mixture of oil and DAP. The resulting products showed complete conversion of the alkyl groups on the methacrylate block to amide groups.

EXAMPLE 2

The reactor was charged with 3819 grams of cyclohexane and sparged with nitrogen. To this was added 503.7 grams of isoprene monomer and the temperature was held at 30° C. The stirred mixture was titrated with sec-butyllithium and then 7.57 ml of sec-butyllithium was added to polymerize the isoprene. The isoprene was allowed to react for ten half-lives and then 137.06 grams of styrene monomer was added. The reaction was stirred for 10 half-lives and the temperature brought to 35° C. Finally, 34.3 grams of tBMA was added and the reaction stirred for 30 minutes. The reaction was quenched with methanol and the product was hydrogenated with the nickel catalyst. GPC indicates 38% coupled material in the product.

EXAMPLE 3

A two liter Büchi reactor was charged with 1500 ml of cyclohexane and 80 grams of isoprene monomer. The stirred solution was titrated with approximately 1 ml of 12.11% sec-butyllithium. After titration the target amount of sec-butyllithium (0.60 grams of 12.11% sec-butyllithium) was added and the isoprene was allowed to polymerize for 1 hour at 45° C. Then 34.3 grams of styrene monomer was added and allowed to polymerize for 45 minutes, with the temperature being reduced to 25° C. during the styrene polymerization. When the styrene block finished polymerizing 2.3 grams of tert-butylmethacrylate (tBMA) monomer was added and allowed to react for 15 minutes. Then 0.05 ml of methanol was added to kill the reaction.

The polymer solution was then hydrogenated with the nickel catalyst. The resulting product showed a 98.6% conversion of the double bonds in the isoprene block. GPC showed 18% coupled material in the product.

The t-butyl groups on the polymer were acidified in a toluene solution for 3 hours with a catalytic amount of pTSA. The acidified polymer was then reacted with DAP at a small stoichiometric excess. The amine salt of the polymer was then recovered by precipitation with methanol and dried in a vacuum oven. The amine salt of the polymer was then heated in the Brabender mixing head at 250° C. for 3 minutes to form the amide derivative of the polymer.

EXAMPLE 4

The polymers of Examples 1-3 and a commercially available polymer having the structure hydrogenated isoprenestyrene (peak mol. wt 60,000-35,000) were formulated into SAE 5W-30 and 10W-40 oils for evaluation. The polymers were first blended in Exxon 100N LP oil at 5% concentration using a Silverson mixer at 120° C. to 130° C. until the polymer was totally dissolved. A small amount of antioxidant wa added to the concentrates to prevent thermal oxidation.

Fully formulated oils were prepared from the above polymer concentrates, Lubrizol DI packages, Aryloid pour depressants and Exxon base stocks. The oils in Tables 1 and 2 were blended with experimental Lubrizol DI packages and Acryloid 155 was used at 0.5%. Exxon 100NLP was used for the SAE 5W-30 oils. Exxon 100NLP and Exxon 352N were used for the 10W-40 oils. The SAE 5W-30 oils were blended to about 11 cSt Kinematic Viscosity (KV) at 100° C. and the 10W-40 oils were blended to about 14 cSt Kinematic Viscosity (KV) at 100° C. and a CCS viscosity of 3200 cP at $-20°$ C.

The lubricating compositions in Tables 1 and 2 were measured for Temperature Profile 1 in the Mini-Rotary Viscometer (TP1-MRV) as determined by ASTM D4684, and for Diesel Injector percent viscosity decrease (DIN, Vis. Dec.) as determined by ASTM D3945 or coordinating European Counsel Test CEL L-14-A-88.

The results in Tables 1 and 2 establish that the dispersant viscosity index improvers of the invention have enhanced high temperature shear stability (higher TBS values).

TABLE 1

RHEOLOGY OF SAE 5W-30 FULLY FORMULATED OIL BLEDS*

|  | Comparison | Example 1 | Example 2 | Example 3 |
| --- | --- | --- | --- | --- |
| Structure | EP-S | EP-S-tBMA | EP-S-tBMA | EP-S-tBMA |
| KV,cST | 10.81 | 11.1 | 10.8 | 10.9 |
| CCS,cP | 3120 | 3120 | 3056 | 3229 |
| TP1-MRV,cP | 15,678 | 15,561 | 13,916 | 15,213 |
| TBS,cP | 2.91 | 3.16 | 2.96 | 3.13 |

*All oils in TABLE 1 contain Exxon LP 100N base oil, Lubrizol experimental DI package, Acryloid 155 pour point depressant, and the indicated VI improver. Oils are all SAE 5W-30 grade.

TABLE 2

RHEOLOGY OF SAE 10W-40 FULLY FORMULATED BLENDS*

| VII | Comparison EP-S | Example 1 EP-S-tBMA | Example 2 EP-S-tBMA | Example 3 EP-S-tBMA |
| --- | --- | --- | --- | --- |
| KV,cSt | 14.1 | 14.3 | 14.0 | 14.3 |
| CCS,cP | 3327 | 3072 | 3229 | 3313 |
| TP1-MRV,cP | 16,427 | 14,867 | 14,938 | 16,215 |
| TBS,cP | 3.51 | 3.76 | 3.53 | 3.88 |
| DIN, % VIS DEC | 4.8 | 3.98 | 14.4 | 18.4 |

*All oils in TABLE 2 contain Exxon LP 100N & 325N base oils, Lubrizol DI package, Acryloid 155 pour point depressant, and the indicated VI improver. Oils are SAE 10W-40 grade.

EXAMPLE 5

A modified blotter spot dispersancy test was performed on each polymer of Examples 1-3 with known DVII polymers used for comparison. A used engine oil from a test car program was doped with 0.5%, 1.0% and 2% of each of the polymer, as concentrates. The mixtures were stirred together, at room temperature, and spotted on Millipore ® 0.45 μ and 0.65 μ filter discs. The same samples were then heated to 50° C. for 10 minutes, cooled and respotted on new filter discs. The candidates and controls all showed active dispersancy.

EXAMPLE 6

The polymers of Examples 1-3 were further compared to commercial dispersant viscosity index improvers with respect to low temperature performance. Table 3 shows SAE 5W-30 oil formulations made from commercial dispersant viscosity index improvers. The cold cranking simulator (CCS) test results establish that the dispersant viscosity index improvers of the invention provide lower viscosity at low temperatures.

TABLE 3

Rheology of SAE 5W-30 oils* containing DVII polymers.

| VII | KV, cSt | CCS,cP |
|---|---|---|
| PARATONE ® 855 | 11.0 | 4142 |
| ARCYLOID ® 954 | 10.8 | 3472 |
| AMOCO ® 6565 | 10.7 | 3527 |
| TLA ® 7200 | 10.8 | 3598 |
| Example 1 | 11.1 | 3120 |
| Example 2 | 10.8 | 3056 |
| Example 3 | 10.9 | 3229 |
| *SAE J300 specifications for 5W-30 oils | 9.3-12.5 | 3500 max. |

What is claimed is:

1. A polymer comprising polymerized blocks of a completely hydrogenated conjugated diene (B) which blocks have from about 6% to 95% 1,2-polymerization and a peak molecular weight from 10,000 to 50,000, a vinylarene (A) which blocks have a peak molecular weight from 1,000 to 50,000, and a methacrylate (M) which blocks have a peak molecular weight from 200 to 10,000 or derivative thereof wherein the polymer is a mixture of first molecules having the polymerized block structure B-A-M and from 10% to 50% by weight of the polymer of second molecules having the coupled block structure B-A-M-A-B.

2. The polymer of claim 1, wherein the conjugated diene is isoprene, the vinylarene is styrene, and the methacrylate is t-butylmethacrylate.

3. The polymer of claim 2, wherein the peak molecular weight of the isoprene blocks ranges from 30,000 to 200,000 and the peak molecular weight of the styrene blocks ranges from 5,000 to 40,000.

4. The polymer of claim 3, wherein the peak molecular weight of the blocks of the t-butylmethacrylate in the B-A-M molecules ranges from 200 to 5,000.

5. The polymer of claim 1, wherein the conjugated diene is isoprene, the vinylarene is styrene, and the methacrylate is completely an amide or imide derivative of an alkyl methacrylate.

6. An oil composition comprising a lubricating oil and a viscosity improving amount of a polymer comprising polymerized blocks of a completely hydrogenated conjugated diene (B) which blocks have from about 6% to 95% 1,2 polymerization and a peak molecular weight from 10,000 to 50,000, a vinylarene (A) which blocks have a peak molecular weight from 1,000 to 50,000, and a methacrylate (M) which blocks have a peak molecular weight from 200 to 10,000, wherein the polymer is a mixture of first molecules having the polymerized block structure B-A-M and from 10% to 50% by weight of the polymer of second molecules having the coupled block structure B-A-M-A-B.

7. The oil composition of claim 6, wherein the conjugated diene is isoprene, the vinylarene is styrene, and the methacrylate is t-butylmethacrylate.

8. The oil composition of claim 7, wherein the peak molecular weight of the isoprene blocks range from 30,000 to 200,000 and the peak molecular weight of the styrene blocks range from 5,000 to 40,000.

9. The oil composition of claim 8, wherein the peak molecular weight of the blocks of the t-butylmethacrylate in the B-A-M molecules ranges from 200 to 5,000.

10. The oil composition of claim 6, wherein the conjugated diene is isoprene, the vinylarene is styrene, and the alkyl methacrylate is completely an amide or imide derivative of t-butylmethacrylate.

* * * * *

UNITED STATES PATENT AND TRADEMARK OFFICE
CERTIFICATE OF CORRECTION

PATENT NO. : 5,272,211
DATED : December 21, 1993
INVENTOR(S) : Robert J. Sutherland and Donn A. Dubois It is certified that error appears in the above-identified patent and that said Letters Patent is hereby corrected as shown below:

Column 7:
In claim 1, line 33, delete "50,000" and insert --500,000--.

Column 8:
In claim 6, line 20, delete "50,000" and insert --500,000--.

Signed and Sealed this

Fifth Day of December, 1995

Attest:

BRUCE LEHMAN

Attesting Officer

Commissioner of Patents and Trademarks